US010864885B2

(12) United States Patent
Ferguson et al.

(10) Patent No.: US 10,864,885 B2
(45) Date of Patent: Dec. 15, 2020

(54) SYSTEMS AND METHODS FOR AUTONOMOUSLY LOADING AND UNLOADING AUTONOMOUS VEHICLES

(71) Applicant: Nuro, Inc., Mountain View, CA (US)

(72) Inventors: David Ferguson, San Francisco, CA (US); Jiajun Zhu, Palo Alto, CA (US)

(73) Assignee: Nuro, Inc., Mountain View, CA (US)

( * ) Notice: Subject to any disclaimer, the term of this patent is extended or adjusted under 35 U.S.C. 154(b) by 226 days.

(21) Appl. No.: 16/048,669

(22) Filed: Jul. 30, 2018

(65) Prior Publication Data

US 2019/0033868 A1 Jan. 31, 2019

Related U.S. Application Data

(60) Provisional application No. 62/538,538, filed on Jul. 28, 2017.

(51) Int. Cl.
*G01C 21/20* (2006.01)
*G01C 21/34* (2006.01)
(Continued)

(52) U.S. Cl.
CPC ............... *B60R 21/36* (2013.01); *A23L 2/52* (2013.01); *A23L 5/00* (2016.08); *A23L 7/109* (2016.08); *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01);
(Continued)

(58) Field of Classification Search
CPC .......... G05D 1/00; G05D 1/12; G05D 1/0088; G05D 1/0272; G05D 1/0242; G05D 1/028; B60R 1/00; B60R 19/00; B60R 19/483; B60R 21/34; G08G 1/00; G08G 1/04; G08G 1/16; G06Q 50/00; G06Q 50/28; G06Q 50/30; G06Q 10/00; G06Q 10/0834; G06Q 30/0631; G06Q 10/083; H04W 4/30; H04W 4/33; H04W 4/35; H04W 4/40; H04W 4/48; G01C 21/34; G06F 3/00
See application file for complete search history.

(56) References Cited

U.S. PATENT DOCUMENTS 9,256,852 B1\* 2/2016 Myllymaki .......... G06Q 10/083
9,547,945 B2\* 1/2017 McCabe ................. B66F 9/063
(Continued)

OTHER PUBLICATIONS

Notification of Transmittal of the International Search Report and the Written Opinion of the International Search Authority, or the Declaration issued in corresponding application No. PCT/US2018/044361 dated Oct. 10, 2018, 12 pages.

*Primary Examiner* — Yonel Beaulieu

(57) ABSTRACT

An autonomous system for loading or unloading an autonomous vehicle, in accordance with aspects of the present disclosure, includes one or more module(s) that include at least one of a compartment or a sub-compartment where the module(s) are located in an autonomous vehicle, a robotic movement apparatus configured to autonomously move items to or from the module(s), one or more processors, and at least one memory storing instructions which, when executed by the processor(s), cause the autonomous system to autonomously move an item, using the robotic movement apparatus, to or from the at least one module of the autonomous vehicle.

22 Claims, 12 Drawing Sheets

(51) Int. Cl.

| | | |
|---|---|---|
| H04W 4/024 | (2018.01) |
| H04W 4/40 | (2018.01) |
| G06F 16/955 | (2019.01) |
| G06N 20/00 | (2019.01) |
| B65G 67/24 | (2006.01) |
| B65G 67/02 | (2006.01) |
| B65G 67/00 | (2006.01) |
| B60P 1/00 | (2006.01) |
| B60P 1/26 | (2006.01) |
| B60P 3/00 | (2006.01) |
| B60R 25/00 | (2013.01) |
| B60R 25/24 | (2013.01) |
| B60R 25/30 | (2013.01) |
| G05D 1/00 | (2006.01) |
| G05D 1/12 | (2006.01) |
| G06K 1/00 | (2006.01) |
| G06K 19/00 | (2006.01) |
| G06Q 10/06 | (2012.01) |
| G06Q 20/00 | (2012.01) |
| G06Q 20/18 | (2012.01) |
| G06Q 20/20 | (2012.01) |
| G06Q 50/28 | (2012.01) |
| G06Q 50/30 | (2012.01) |
| B60R 21/36 | (2011.01) |
| G08G 1/04 | (2006.01) |
| B60R 21/34 | (2011.01) |
| G05D 1/02 | (2020.01) |
| G06K 7/10 | (2006.01) |
| G06Q 10/08 | (2012.01) |
| G06Q 50/12 | (2012.01) |
| G08G 1/00 | (2006.01) |
| H04L 29/08 | (2006.01) |
| B60R 25/25 | (2013.01) |
| A23L 5/00 | (2016.01) |
| A23L 7/109 | (2016.01) |
| A23L 2/52 | (2006.01) |
| A47J 37/06 | (2006.01) |
| A47J 47/00 | (2006.01) |
| B60H 1/00 | (2006.01) |
| B60P 1/36 | (2006.01) |
| B60P 3/025 | (2006.01) |
| B60R 19/18 | (2006.01) |
| G06K 7/14 | (2006.01) |
| G06K 19/06 | (2006.01) |
| G06Q 20/12 | (2012.01) |
| G06Q 30/06 | (2012.01) |
| G07F 17/00 | (2006.01) |
| G07F 17/12 | (2006.01) |
| H05B 6/68 | (2006.01) |
| G06K 9/00 | (2006.01) |
| G06K 19/07 | (2006.01) |
| G06Q 30/02 | (2012.01) |
| B60R 19/48 | (2006.01) |
| G06F 3/0484 | (2013.01) |
| H04N 5/76 | (2006.01) |

(52) U.S. Cl.
CPC .............. *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 9/00201* (2013.01); *G06K 9/00791* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0266* (2013.01); *G06Q 30/0631* (2013.01); *G06Q 30/0645* (2013.01); *G06Q 50/12* (2013.01); *G06Q 50/28* (2013.01); *G06Q 50/30* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *H05B 6/688* (2013.01); *A23V 2002/00* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01)

(56) References Cited

U.S. PATENT DOCUMENTS

| | | | |
|---|---|---|---|
| 9,731,896 B2* | 8/2017 | Elazary | B25J 15/0028 |
| 10,380,534 B2* | 8/2019 | Khasis | G01C 21/3415 |
| 2010/0084426 A1 | 4/2010 | Devers et al. | |
| 2012/0239224 A1* | 9/2012 | McCabe | G05D 1/0297 |
| | | | 701/2 |
| 2014/0081445 A1 | 3/2014 | Villamar | |
| 2015/0006005 A1 | 1/2015 | Yu et al. | |
| 2016/0304281 A1* | 10/2016 | Elazary | B25J 15/06 |
| 2017/0174343 A1 | 6/2017 | Erickson et al. | |
| 2018/0025635 A1 | 1/2018 | Cheaz et al. | |
| 2018/0158020 A1* | 6/2018 | Khasis | G01C 21/3453 |
| 2018/0330313 A1 | 11/2018 | Clarke et al. | |
| 2019/0033868 A1* | 1/2019 | Ferguson | G05D 1/0088 |
| 2019/0164113 A1* | 5/2019 | Fosgard | G05D 1/0225 |
| 2019/0347614 A1* | 11/2019 | Khasis | G01C 21/3415 |
| 2020/0050858 A1* | 2/2020 | Jung | G06K 9/00832 |

* cited by examiner

SYSTEMS AND METHODS FOR AUTONOMOUSLY LOADING AND UNLOADING AUTONOMOUS VEHICLES

CROSS-REFERENCE TO RELATED APPLICATIONS

The present application claims priority to U.S. Provisional Application No. 62/538,538, filed on Jul. 28, 2017, which is hereby incorporated by reference in its entirety.

FIELD OF THE TECHNOLOGY

The present application relates to autonomous vehicles, and in particular, to autonomous loading and unloading of autonomous vehicles.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

One of the largest costs for using autonomous robots is the involvement of human facilitators in various aspects of the robot operation. Additionally, involvement of humans in the robot operation can slow down the overall system and reduce its efficiency and throughput. Accordingly, there is continuing interest in improving efficiency and effectiveness of autonomous robot operations.

SUMMARY

This disclosure relates to a fully-autonomous and/or semi-autonomous robot fleet and, in particular, to a fleet of robot vehicles for transporting or retrieving deliveries in either unstructured outdoor environment or closed environments. In accordance with aspects of the present disclosure, the present disclosure includes systems and methods for autonomously loading and unloading autonomous vehicles.

In accordance with aspects of the present disclosure, an autonomous system for loading or unloading an autonomous vehicle includes one or more module(s) that include at least one of a compartment or a sub-compartment located in an autonomous vehicle, a robotic movement apparatus configured to autonomously move items to or from the module(s), one or more processors, and at least one memory storing instructions which, when executed by the processor(s), cause the autonomous system to autonomously move an item using the robotic movement apparatus to or from the module(s) of the autonomous vehicle.

In various embodiments, the module(s) include a plurality of modules, and the instructions, when executed by the one or more processors, cause the autonomous system to associate each of the plurality of modules with a different customer, identify a customer of the item, and determine one module of the plurality of modules associated with the identified customer, where autonomously moving the item includes autonomously moving the item to or from the one module. In various embodiments, the robotic movement apparatus includes a conveyor belt.

In various embodiments, the autonomous system includes an imaging device configured to capture imaging information of the module(s).

In various embodiments, the instructions, when executed by the processor(s), cause the autonomous system to identify, based on the imaging information, an available space within the module(s) that can receive the item, where autonomously moving the item includes autonomously moving the item to the available space.

In various embodiments, the item is contained in the module(s), and the instructions, when executed by the processor(s), cause the autonomous system to locate the item within the module(s) based on the imaging information, where autonomously moving the item includes autonomously moving the item out of the module(s).

In various embodiments, the item is contained in the module(s) and includes a barcode, the imaging information includes an image of the barcode, and the instructions, when executed by the processor(s), cause the autonomous system to locate the item in the at least one module based on the image of the barcode.

In various embodiments, the imaging device is located in the autonomous vehicle. In various embodiments, the robotic movement apparatus includes a robotic arm within the autonomous vehicle, and the imaging device is secured to the robotic arm.

In various embodiments, the robotic movement apparatus is separate from the autonomous vehicle.

In various embodiments, the item includes an RFID tag, the robotic movement apparatus includes a robotic arm, and an RFID reader is secured to the robotic arm and configured to read the RFID tag.

In various embodiments, the autonomous system includes a communication sub-system of the autonomous vehicle and one or more access doors of the autonomous vehicle corresponding to the module(s) and configured to open to provide access to the module(s).

In various embodiments, the instructions, when executed by the processor(s), further cause the autonomous system to authenticate a transfer operation with a transfer confirmation system where the transfer operation includes a customer identifier, determine one module of the module(s) assigned to the customer identifier, and open one of the at access door(s) corresponding to the one module to provide access to the one module. In various embodiments, the transfer operation is a loading operation, and the transfer confirmation system is a system of a facility. In various embodiments, the transfer operation is an unloading operation, and the transfer confirmation system is a customer management system.

In accordance with aspects of the present disclosure, an autonomous method for autonomously loading or unloading an autonomous vehicle includes establishing communications between a transfer confirmation system and an autonomous vehicle having one or more module(s) that include at least one of a compartment or a sub-compartment, and one or more access door(s) corresponding to the module(s) and configured to open to provide access to the module(s). The autonomous method includes authenticating a loading operation with the transfer confirmation system where the loading operation including a customer identifier, determining one module of the module(s) assigned to the customer identifier, opening one access door of the access door(s) corresponding to the one module to provide access to the one module, and autonomously moving an item included in the transfer operation to the one module of the autonomous vehicle.

In various embodiments, the autonomous vehicle includes an imaging device configured to obtain imaging information of the module(s), and the autonomous method includes identifying, based on the imaging information, an available space within the at module(s) that can receive the item, where moving the item includes moving the item to the available space.

In various embodiments, the autonomous method includes authenticating an unloading operation with a customer management system, opening the one access door to provide access to the one module, and autonomously moving the item out of the one module of the autonomous vehicle.

In various embodiments, the autonomous vehicle includes an imaging device configured to obtain imaging information of the module(s), and the autonomous method includes locating the item within the one module based on the imaging information.

In various embodiments, the item includes an RFID tag, the autonomous vehicle includes an RFID reader, and the autonomous method includes locating the item within the one module using the RFID reader and the RFID tag.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
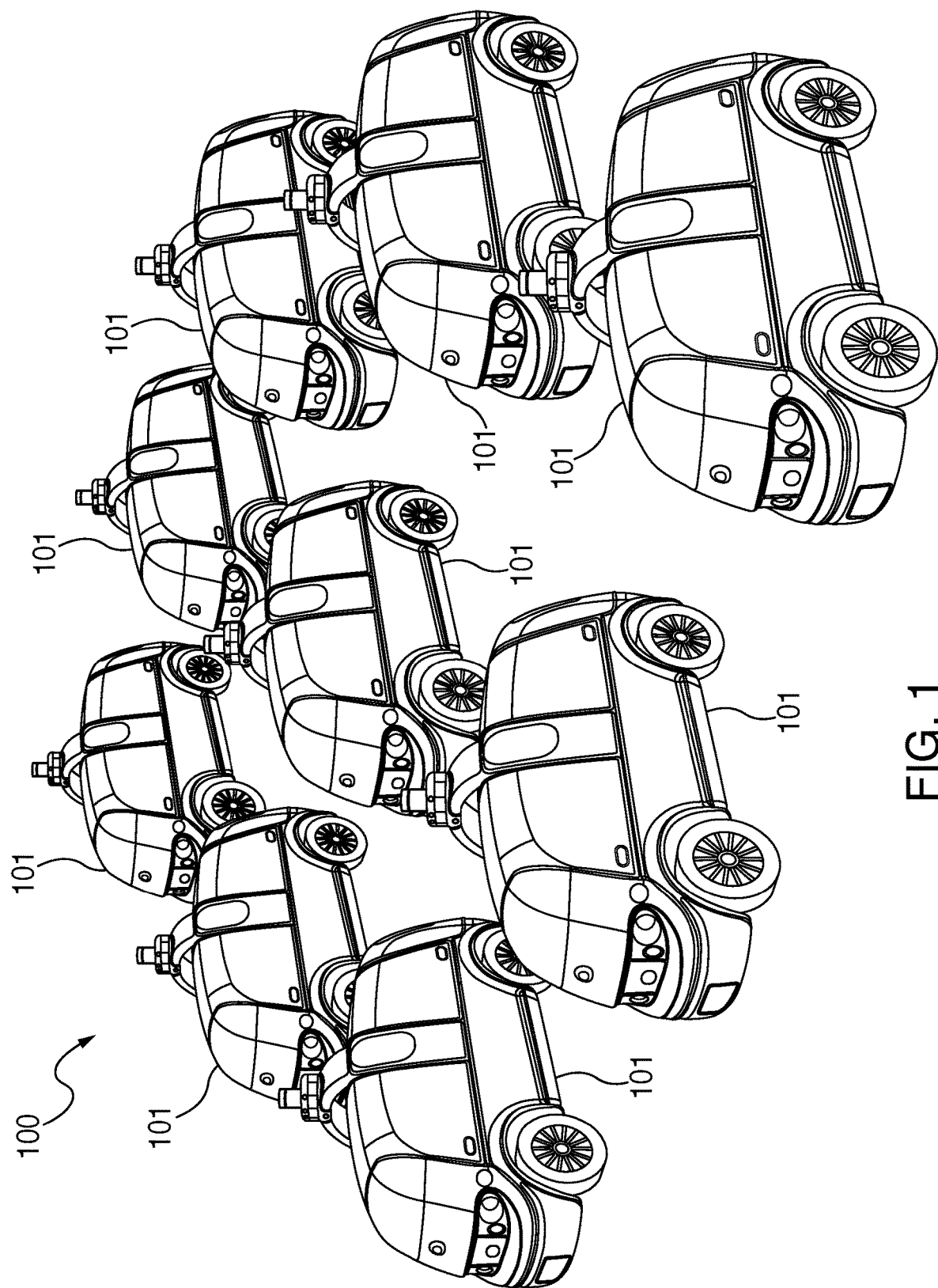
FIG. 1 is an exemplary view an autonomous robot fleet, wherein each vehicle within a fleet or sub-fleet can be branded for an entity.

This disclosure relates to a fully-autonomous and/or semi-autonomous robot fleet and, in particular, to robot vehicles for transporting or retrieving deliveries in either open unstructured outdoor environments or closed environments. In accordance with aspects of the present disclosure, the present disclosure includes systems and methods for autonomously loading and unloading autonomous vehicles.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can operate in a controlled manner for a period of time without human intervention.

As used herein, the term "fleet," "sub-fleet," and like terms are used to indicate a number of land vehicles, watercraft or aircraft operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "compartment" is used to indicate an internal bay of a robot vehicle that has a dedicated door at the exterior of the vehicle for accessing the bay, and also indicates an insert secured within the bay. As used herein, the term "sub-compartment" is used to indicate a subdivision or portion of a compartment. Additionally, within the context of descriptions relating to compartments and sub-compartments, the term "module" may be used herein to refer to a compartment and/or a sub-compartment.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In in some embodiments, the robot fleet is fully-autonomous.

In in some embodiments, the robot fleet is semi-autonomous. In some embodiments, it may be necessary to have human interaction between the robot 101, the fleet operator 200, the provider 204 and/or the customer 202 to address previously unforeseen issues (e.g., a malfunction with the navigation module; provider inventory issues; unanticipated traffic or road conditions; or direct customer interaction after the robot arrives at the customer location).

In in some embodiments, the robot fleet 100 is controlled directly by the user 200. In some embodiments, it may be necessary to have direct human interaction between the robot 101 and/or the fleet operator 200 to address maintenance issues such as mechanical failure, electrical failure or a traffic accident.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments, the robot fleet is configured for water travel as a watercraft and is configured with a working speed range from 1.0 mph to 45.0 mph.

In some embodiments, the robot fleet is configured for hover travel as an over-land or over-water hovercraft and is configured with a working speed range from 1.0 mph to 60.0 mph.

In some embodiments, the robot fleet is configured for air travel as an aerial drone or aerial hovercraft and is configured with a working speed range from 1.0 mph to 80.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-a, 100-b).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each robot 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

Figure 11:
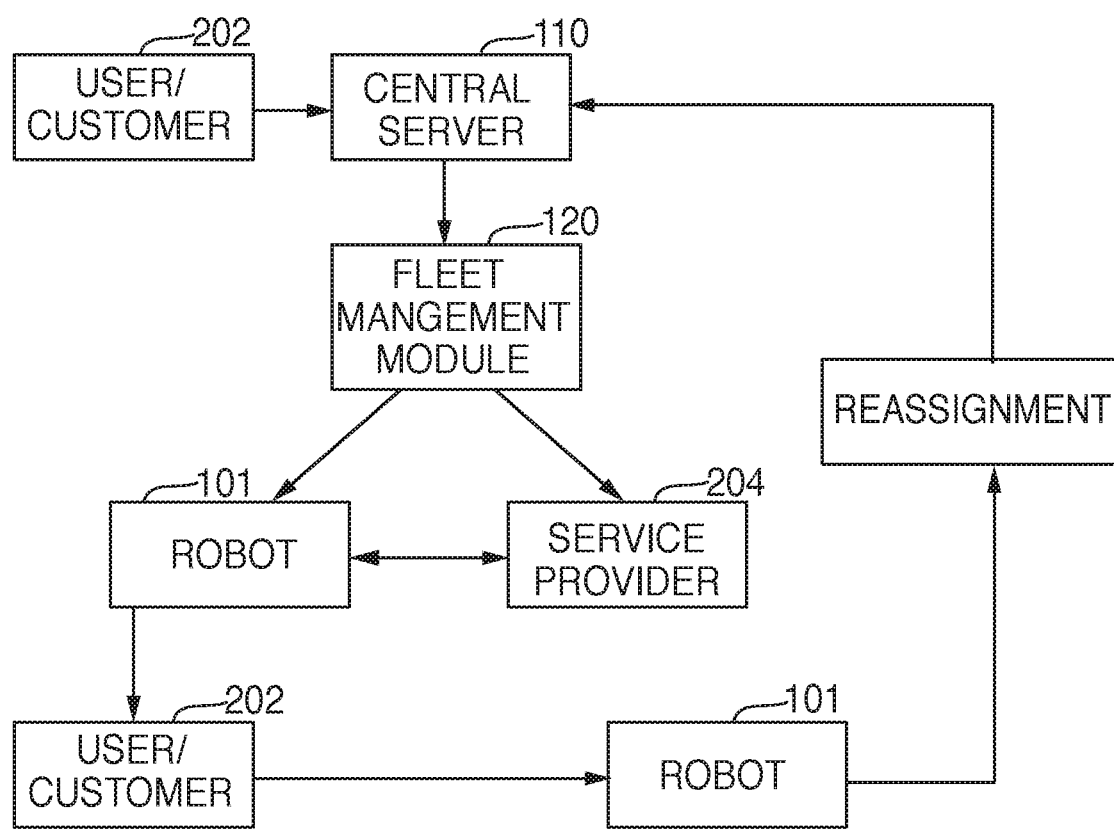
FIG. 11 is an exemplary flowchart representation of the logic for a fleet management control module associated with a central server for the robot fleet.

As illustrated in FIG. 11, in one embodiment, a request is sent to a main server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot or robots 101 in the fleet. The best appropriate robot(s) in the fleet within the geographic region and typically closest to the service provider, is then assigned the task, and the provider of the service 204 then interacts with that robot 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 12:
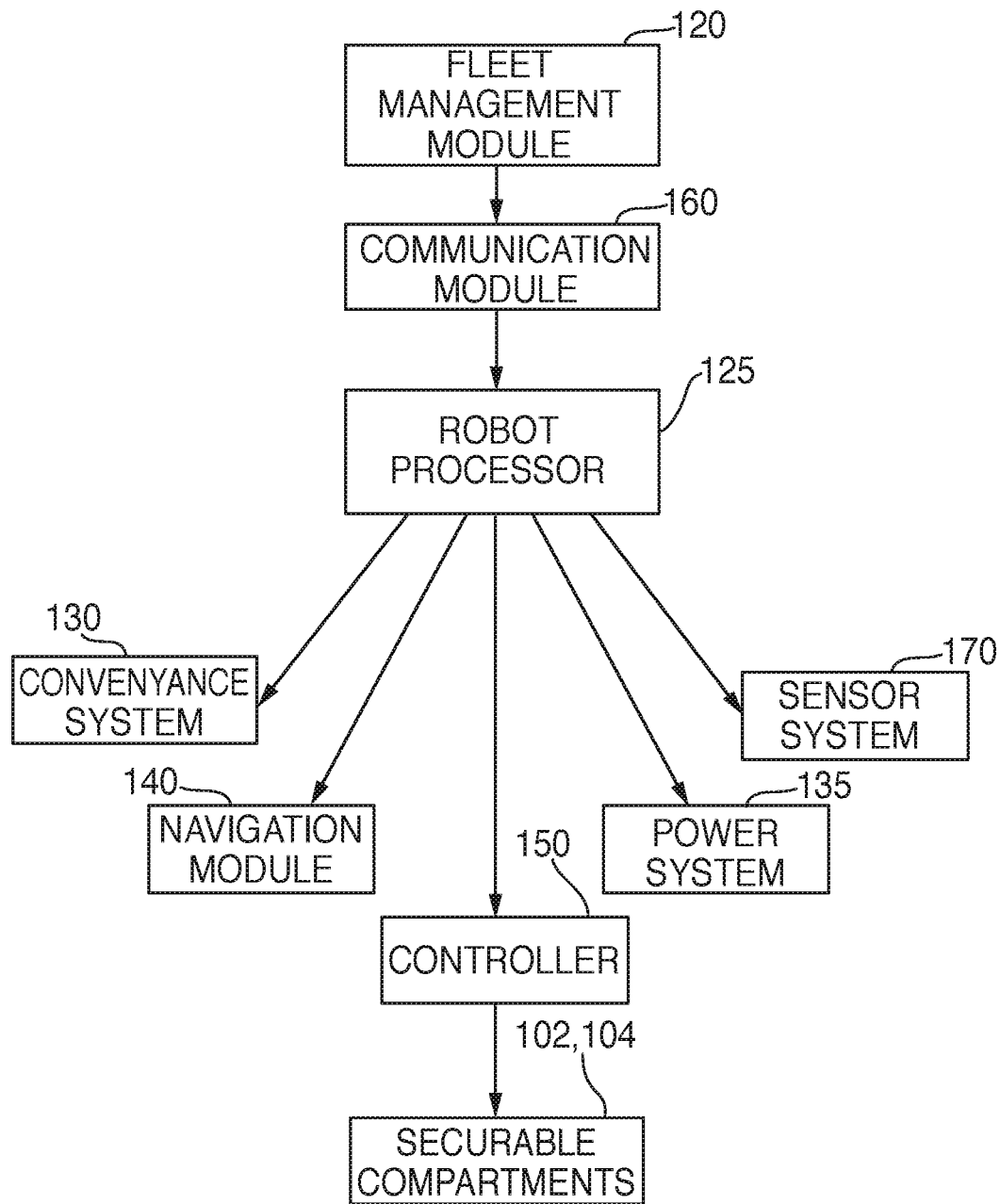
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot 101 in the fleet. The fleet management module coordinates the activity and positioning of each robot in the fleet. The fleet management module also communicates with vendors/businesses 204 and customers 202 to optimize behavior of entire system. It does this by utilizing the robot's processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land, water or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet is configured for water travel as a watercraft with a propulsion system (engine) that is configurable as a gas engine, a turbine engine, an electric motor and/or a hybrid gas/electric engine and is further configured with a propeller.

In some embodiments, the robot fleet is configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows land, sea, and airborne users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

In various embodiments, a robot vehicle can include an imaging device that captures imaging information of one or more compartments or sub-compartments of the autonomous robot vehicle. In various embodiments, the imaging device can use one or more of a camera, 3D camera, depth camera, LiDAR, ultrasonics, or radar, or another technology that can be used to generate an image of the contents of a compartment or sub-compartment. The imaging information can include still images and/or motion video, for example. As described in more detail in connection with FIG. 14, when multiple items are stored in compartments or sub-compartments, the robot vehicle can use the imaging information to autonomously identify particular items and determine their locations within the compartments or sub-compartments.

In various embodiments, a robot vehicle can include an RFID reader that reads RFID tags. Items stored in compartments or sub-compartments of the autonomous robot vehicle can have RFID tags. As described in more detail in connection with FIG. 14, when multiple items are stored in compartments or sub-compartments, the robot vehicle can use the RFID tags to autonomously identify particular items and determine their locations within the compartment or sub-compartments.

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

As described in more detail in connection with FIG. 15, in various embodiments, the communication module 160 can communicate with a transfer confirmation system regarding autonomous loading or unloading or items to or from the autonomous robot vehicle. In various embodiments, the transfer confirmation system can be a system of a warehouse or other facility where items are to be picked up or dropped off. In various embodiments, the transfer confirmation system can be a customer management system which manages customer orders and/or customer verification.

Goods and Services

In some embodiments, the user includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

Securable Compartments

Figure 2:
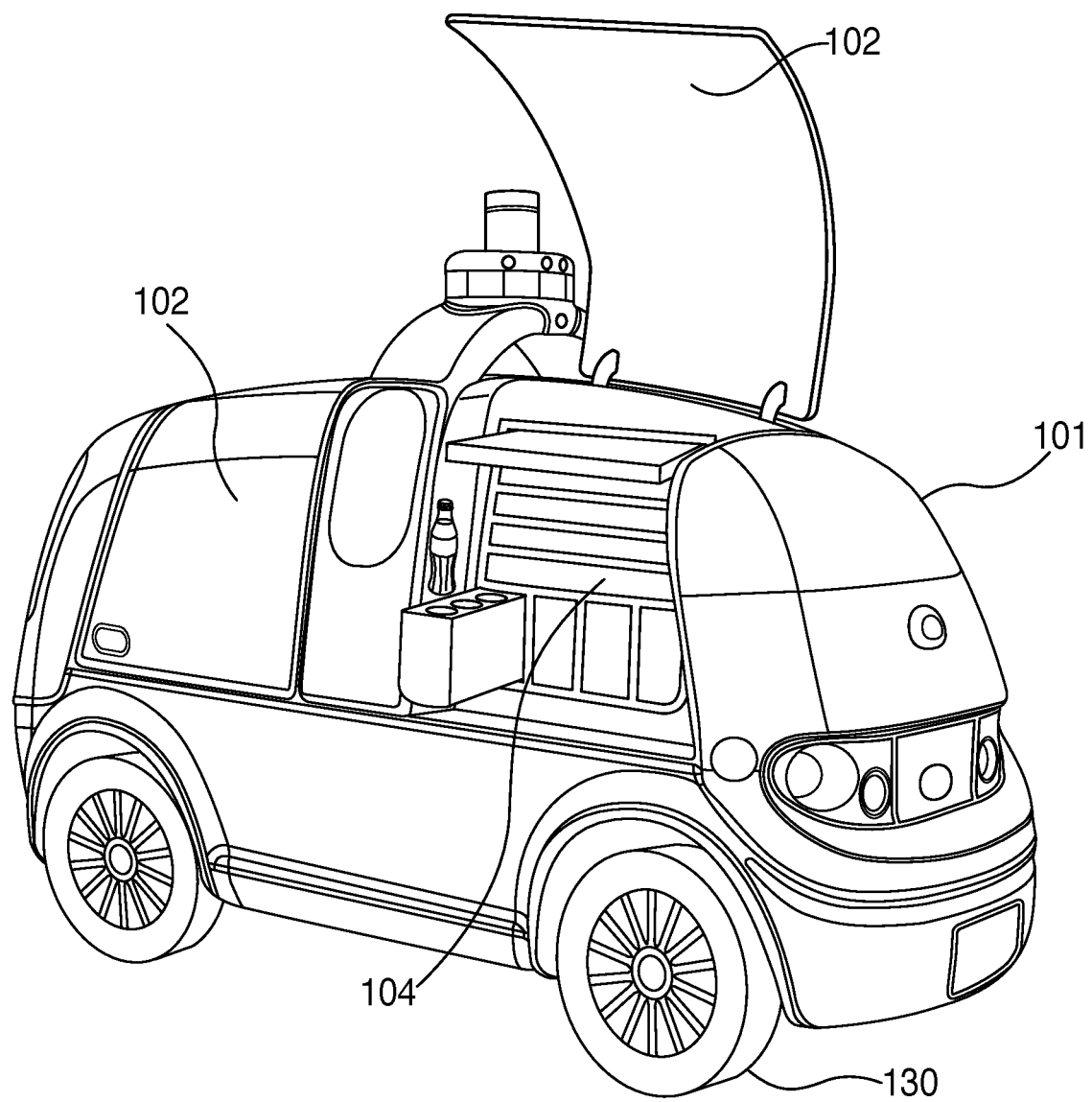
FIG. 2 is an exemplary ISO view of a robot vehicle, part of an autonomous robot fleet, illustrating securable compartments within the vehicle.
Figure 3:
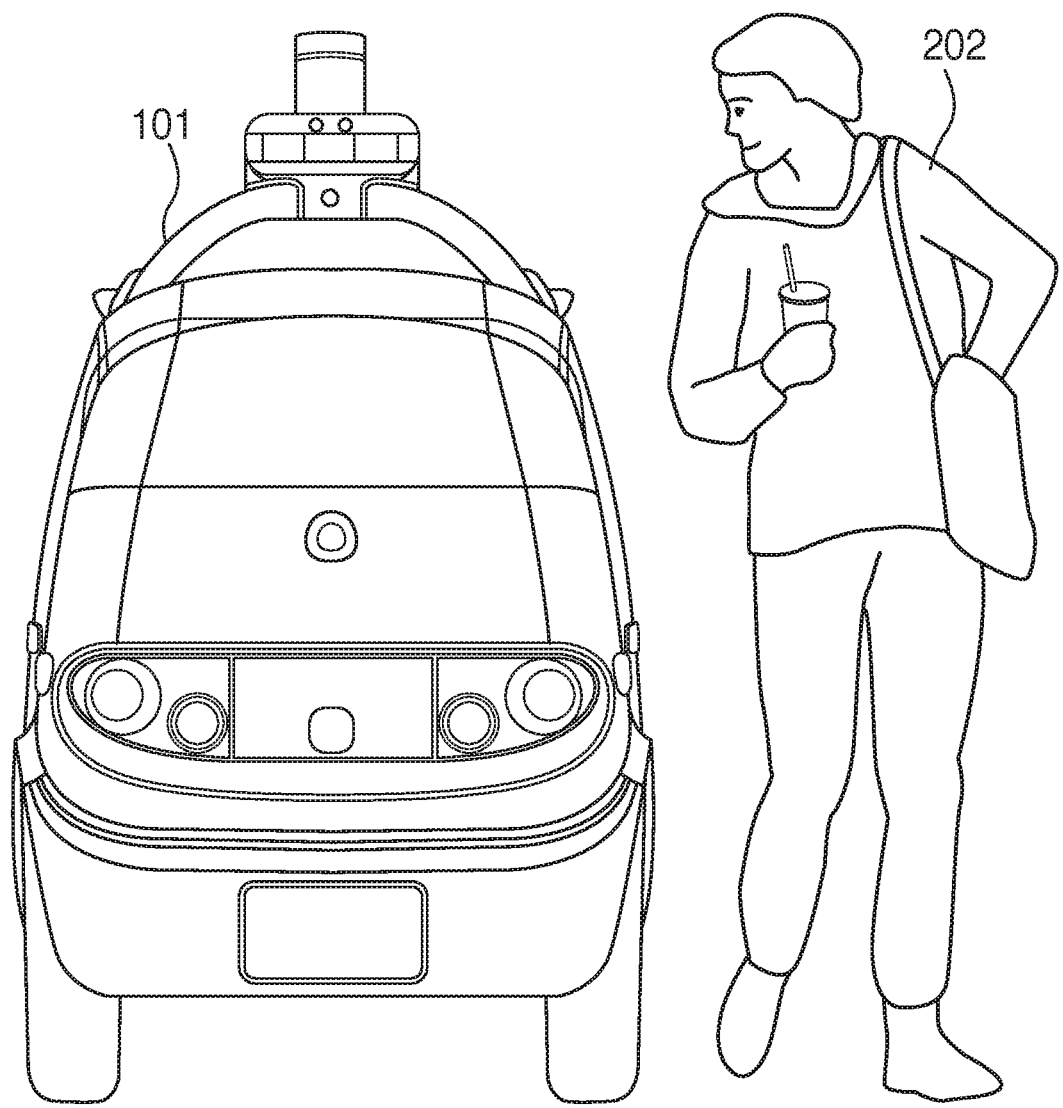
FIG. 3 is an exemplary front view of a robot vehicle, part of an autonomous robot fleet, shown in comparison to the height of an average person.
Figure 4:
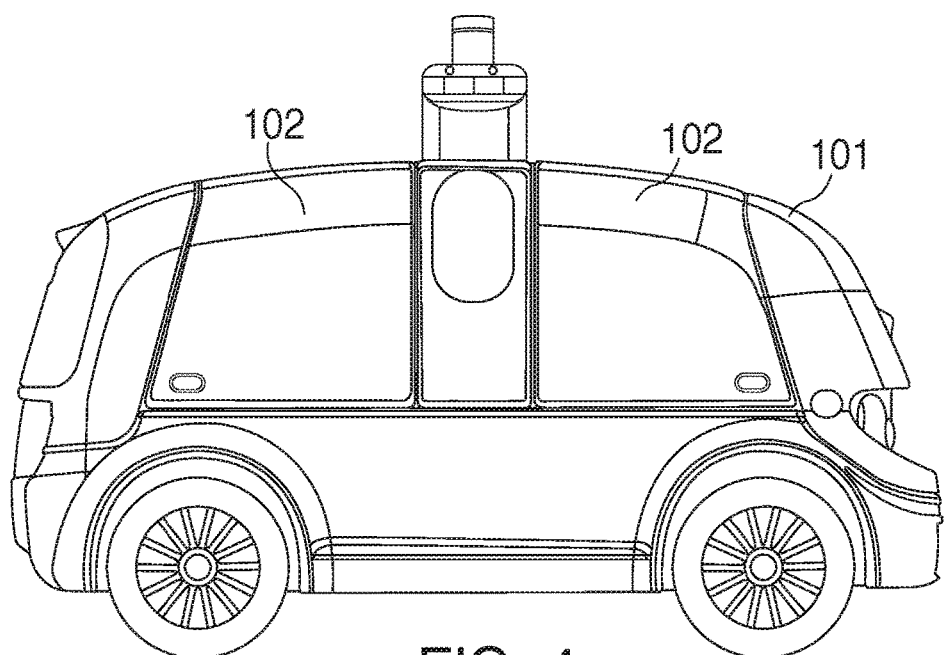
FIG. 4 is an exemplary right side view of a robot vehicle, part of an autonomous robot fleet, illustrating a configuration with two large side doors, each enclosing securable compartments.
Figure 5:
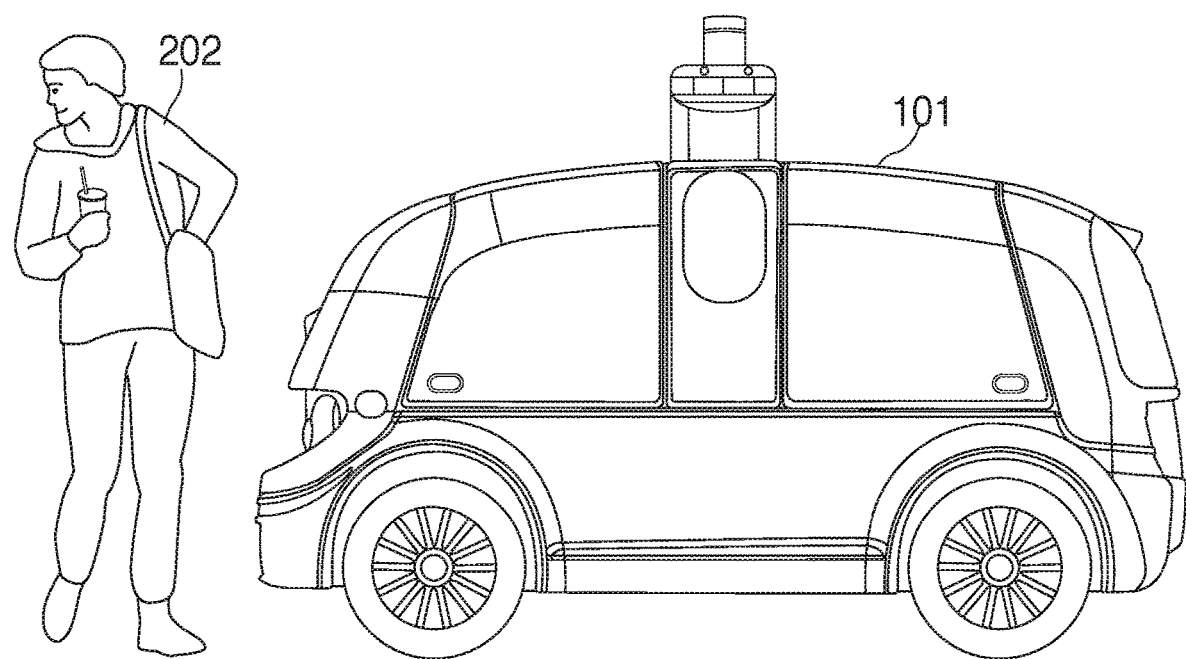
FIG. 5 is an exemplary left side view of a robot vehicle, part of an autonomous robot fleet, shown in comparison to the height of an average person.
Figure 6:
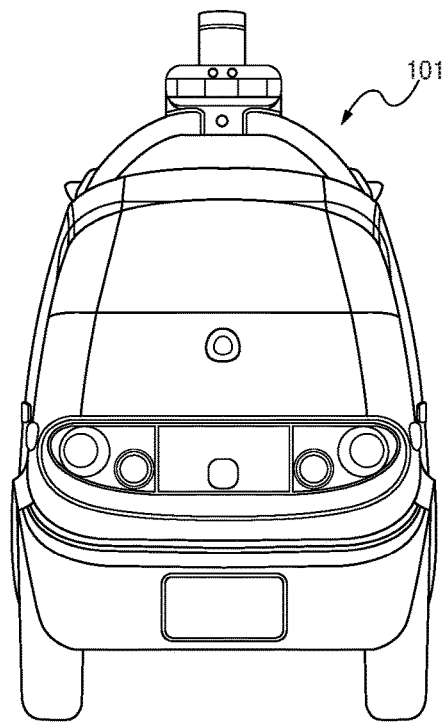
FIG. 6 is an exemplary rear view of a robot vehicle, part of an autonomous robot fleet.
Figure 7:
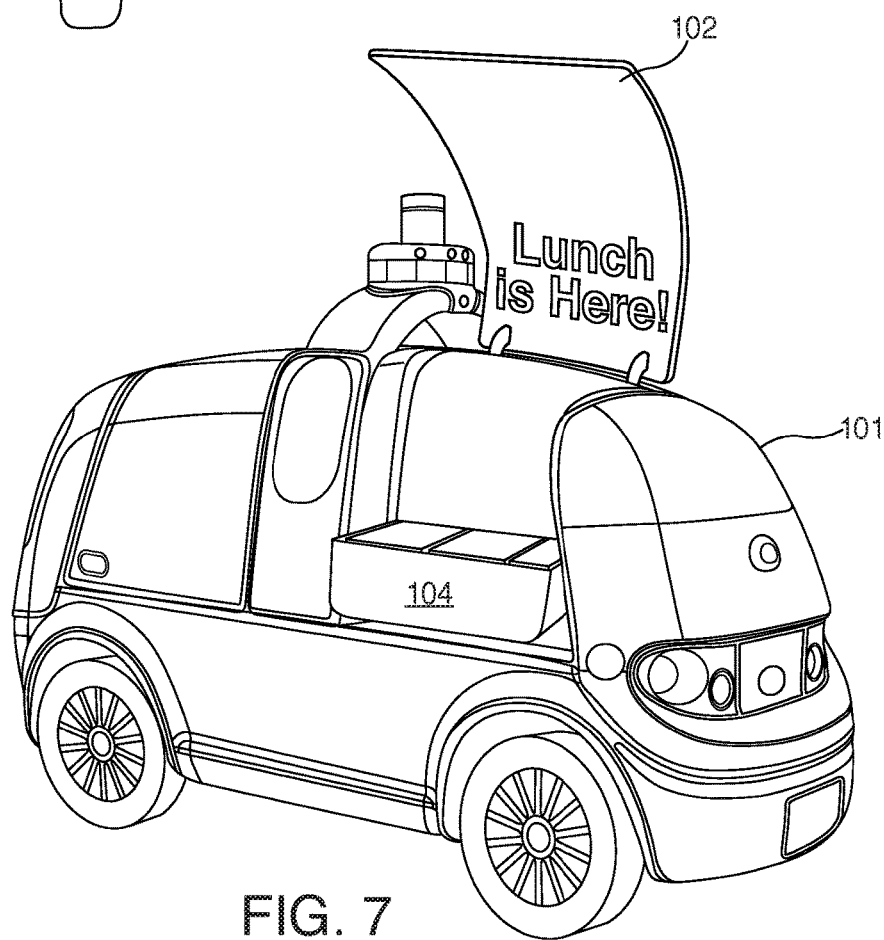
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving goods or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers.

Alternately, in some embodiments, the vehicle could be configured for water travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for aerial drone or aerial hover travel, providing at least one and preferably two large storage compartments, and more preferably, at least one large compartment is configured with smaller internal secure compartments of variable configurations to carry individual items that are to be delivered to, or need to be retrieved from customers.

Figure 8:
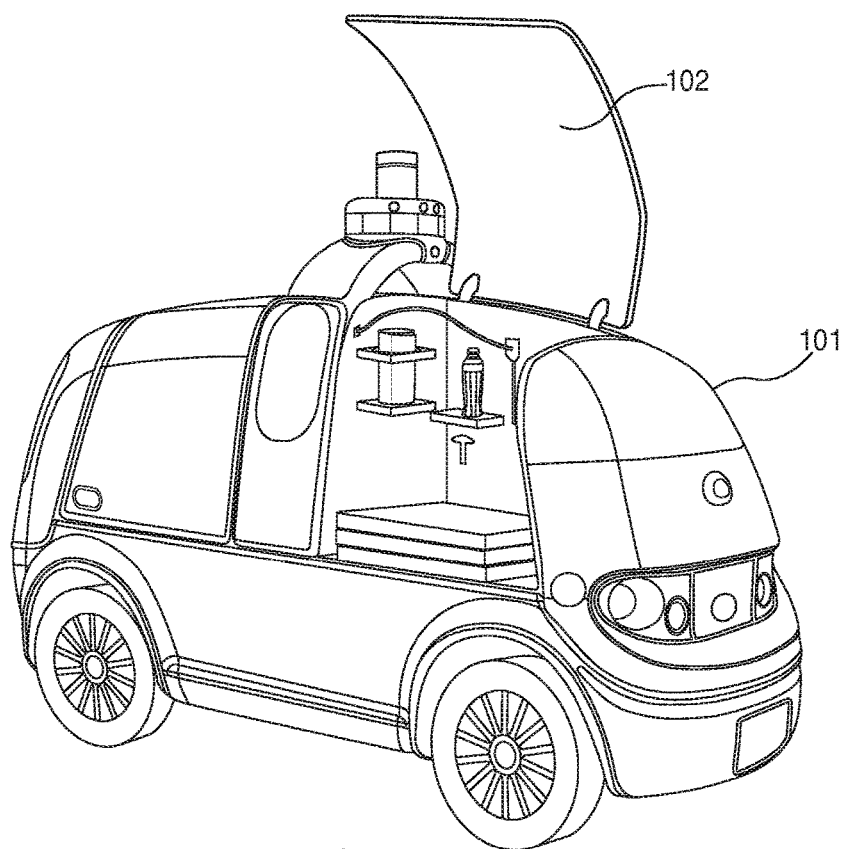
FIG. 8 is an exemplary ISO view of a robot vehicle, part of an autonomous robot fleet, illustrating an autonomous pizza delivery vehicle for any branded company.
Figure 9:
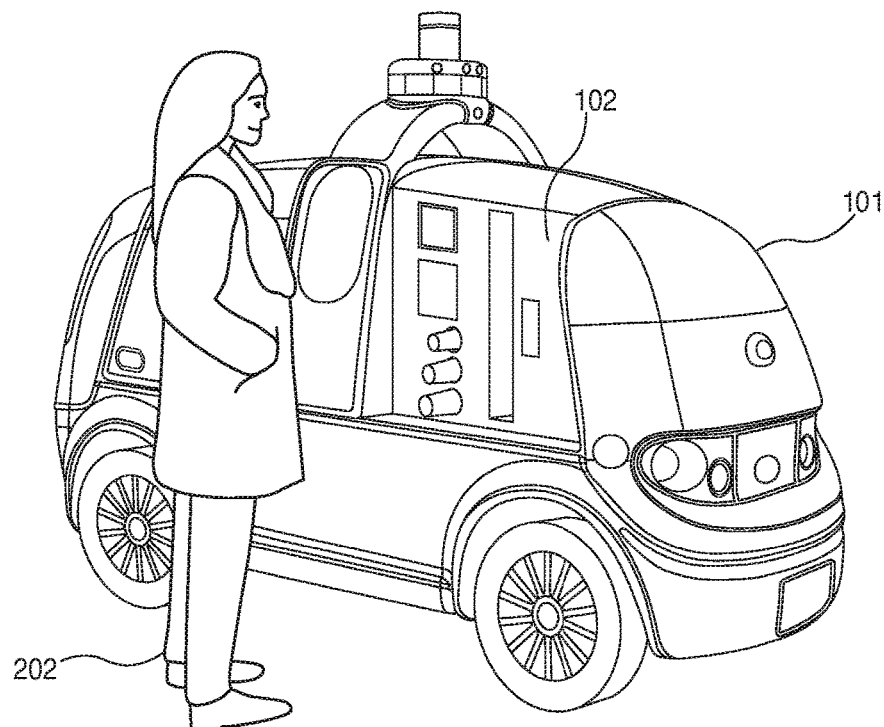
FIG. 9 is an exemplary ISO view of a robot vehicle, part of an autonomous robot fleet, illustrating an autonomous coffee delivery vehicle for any branded company.
Figure 10:
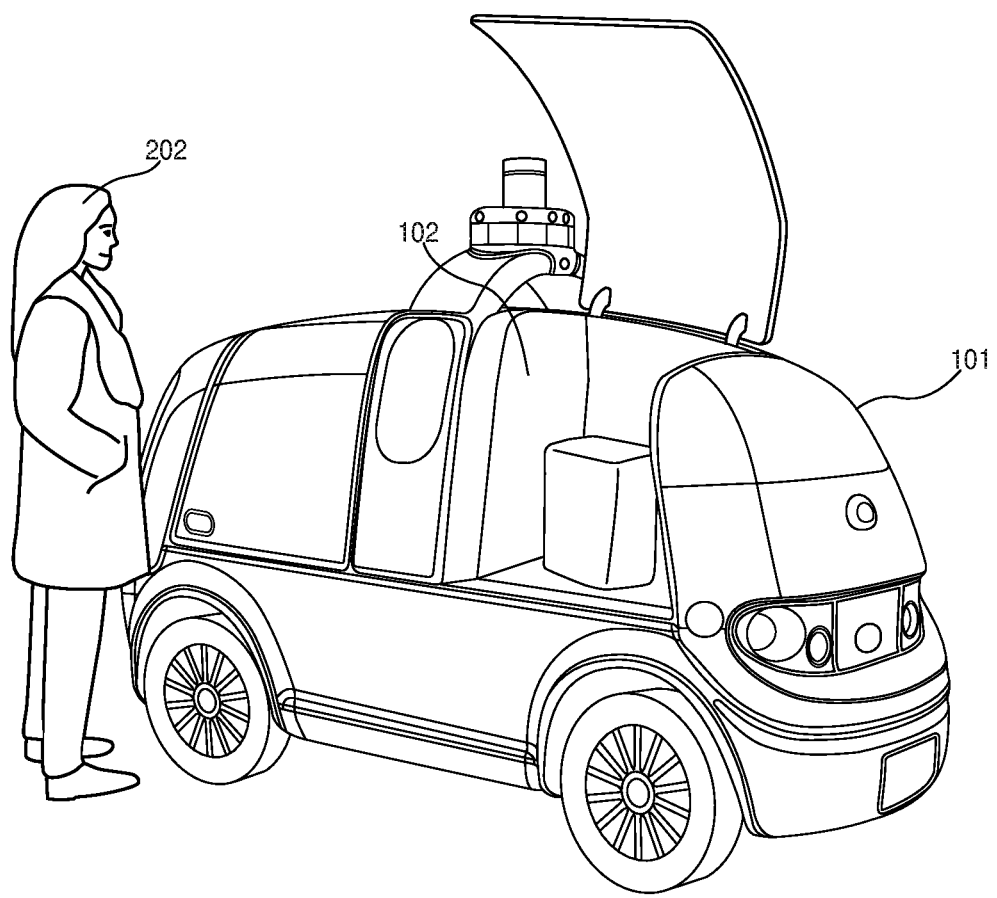
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various goods. Such configurations and goods include: bookshelves for books, thin drawers for documents, larger box-like drawers for packages, and sized compartments for vending machines, coffee makers, pizza ovens and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized, each robot vehicle further includes at least one processor configured to manage the conveyance system, the navigation module, the sensor system, instructions from the fleet management module, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202. As shown in FIGS. 2 and 7-10, each robot includes access doors that can open to provide access to compartments or sub-compartments.

Upon arrival of the robot to the customer destination, the customer can then open their respective compartment(s) by verifying their identity with the robot. This can be done through a wide variety of approaches comprising, but not limited to:

1. The customers can be given a PIN (e.g., 4 digit number) when they make their initial request/order. They can then enter this pin at the robot using the robot touchscreen or a keypad.
2. The customers can verify themselves using their mobile phone and an RFID reader on the robot.
3. The customers can verify themselves using their voice and a personal keyword or key phrase they speak to the robot.
4. The customers can verify themselves through their face, a government ID, or a business ID badge using cameras and facial recognition or magnetic readers on the robot.
5. The customers can verify themselves using their mobile phone; by pushing a button or predetermined code on their phone (and the system could optionally detect the customer is near the robot by using their GPS position from phone)

When a customer is verified, the autonomous robot vehicle can open the access door corresponding to the compartment or sub-compartment assigned to the customer, and provide access to the customer's item(s).

Figure 13:
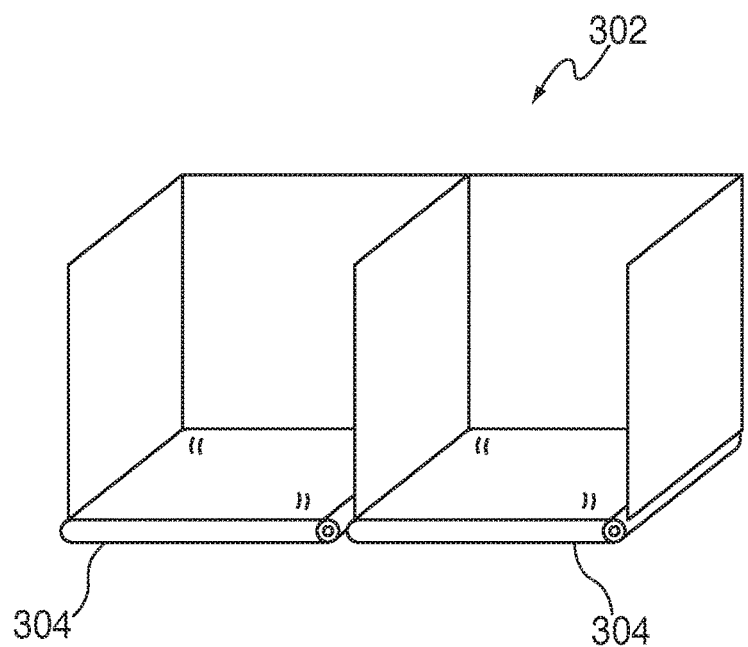
FIG. 13 is a diagram of exemplary compartments or sub-compartments for autonomously loading or unloading items, in accordance with aspects of the present disclosure.

Referring now to FIG. 13, there is shown a diagram of exemplary compartments or sub-compartments 302 that can operate to autonomously load or unload items. In the illustrated embodiment of FIG. 13, each compartment or sub-compartment 302 can include a conveyor belt 304 that can advance in one direction to move items into the compartment 302 and advance in a reverse direction to move items out of the compartment 302. In the case that each compartment 302 is assigned to a different customer, all items in a single compartment or sub-compartment 302 are associated with the same customer and can all be moved together by the conveyor belt 304. An autonomous vehicle having the illustrated compartments 302 can communicate with another system, such as a warehouse system or facility system, to coordinate the receiving of items onto the conveyor belts 304 or the dispensing of items off the conveyor belts 304. The illustrated conveyor belts 304 are an example of a robotic movement apparatus and do not limit the scope of the present disclosure. Other types of robotic movement apparatus are contemplated.

Figure 14:
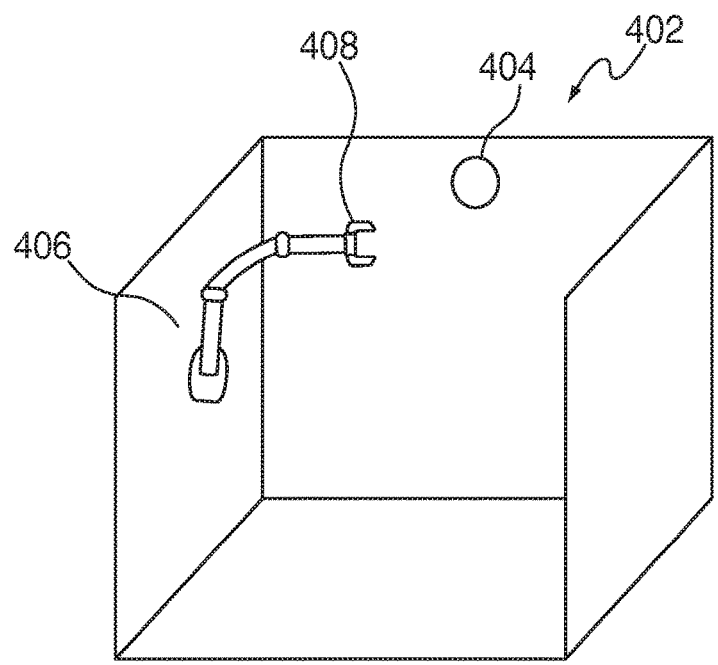
FIG. 14 is a diagram of another exemplary compartment or sub-compartment for autonomously loading or unloading items, in accordance with aspects of the present disclosure.

Referring now to FIG. 14, there is shown a diagram of another exemplary compartment or sub-compartment 402 that can operate to autonomously load or unload items. The illustrated compartment or sub-compartment 402 includes an imaging device 404 and a robotic arm 406. In various embodiments, the imaging device 404 can be a camera that captures visual information of the compartment or sub-compartment 402, such as still images and/or motion video. In various embodiments, the imaging device can use one or more of a camera, 3D camera, depth camera, LiDAR, ultrasonics, or radar, or another technology that can be used to generate an image of the contents of a compartment or sub-compartment. The processor (125, FIG. 12) of the autonomous vehicle can process the imaging information to distinguish and identify items that are stored in the compartment or sub-compartment 402. In various embodiments, each item can include a barcode, such as one-dimensional or two-dimensional barcodes, and the robot vehicle can process the barcodes to identify the item. In various embodiments, machine learning, computer vision, and/or neural network technology can be used to process the imaging information to distinguish and identify different items in the compartment or sub-compartment 402. In various embodiments, the processor 125 can process the imaging information to detect specific items based on their appearance or shape. As an example, the compartment or sub-compartment 402 may be used to store objects of multiple customers or objects not associated with any particular customer, such as when the autonomous vehicle serves as a general marketplace of assorted items. In such configurations, the autonomous vehicle would need to distinguish and identify different items in the compartment or sub-compartment 402 and unload only particular items at a customer location.

In various embodiments, the processor 125 can process the imaging information to identify available space in the compartment or sub-compartment 402 for receiving an additional item to be stored in the compartment or sub-compartment 402. In various embodiments, machine learning, computer vision, and/or neural network technology can be used to process the imaging information to identify available space.

In various embodiments, the imaging device 404 can coordinate with the robotic arm 406 to locate an item for the robotic arm 406 to manipulate. The robot arm 406 can include multiple segments coupled together by multi-directional joints. One or more segments can be telescoping segments that can extend or retract. The robot arm 406 can be configured to reach any space within the compartment or sub-compartment 402 through the combination of multi-directional joints and telescoping segments. The engagement portion 408 of the robotic arm 406 is shown as a mechanical grip. In various embodiments, the engagement portion 406 can utilize suction, a hook, or another mechanism to manipulate items.

An autonomous vehicle having the illustrated compartment 402 can communicate with another system, such as a warehouse system or facility system, to coordinate the receiving of items into the compartment 402 or the removal of items from the compartment 402. As an example, the imaging device 404 can capture an image of a space (not shown) outside the compartment 402, such as on a conveyor belt of a warehouse or other facility, or a customer mailbox. If an item is to be moved from the space outside the compartment 402 into the compartment 402, the robot arm 406 of the compartment 402 can pick up the item and move it into the compartment 402. If an item is to be removed from the compartment 402 to a space outside the compartment 402, the robotic arm 406 of the compartment can pick up the item and move it outside the compartment 402. For example, the robotic arm 406 can move an item outside the autonomous vehicle to a customer mailbox, sidewalk, driveway, curb, residence, drop site, or another customer location.

The embodiments shown and described above are merely exemplary and variations are contemplated to be within the scope of the present disclosure. In various embodiments, the imaging device 404 can be located on a portion of the robotic arm 406. In various embodiments, the imaging device 404 and/or the robotic arm 406 can be located outside the compartment or sub-compartment 402, but in another portion of the autonomous vehicle. Such a robotic arm and/or imaging device may be able to, for example, access multiple compartments or sub-compartments. The illustrated robotic arm 406 is an example of a robotic movement apparatus and does not limit the scope of the present disclosure. Other types of robotic movement apparatus are contemplated. In various embodiments, the imaging device 404 can be secured to the various types of robotic movement apparatuses, such as secured to a conveyor belt.

In various embodiments, items in the compartment or sub-compartment 402 can include RFID tags, and an RFID reader (not shown) can be secured to a portion of the robotic arm 406, such as an end portion of the robotic arm 406. As persons skilled in the art will understand, an RFID reader needs to be within a certain proximity to an RFID tag to read the RFID tag. In various embodiments, the imaging device 404 and processor 125 can cooperate with the robotic arm 406 to guide the RFID reader to be in proximity to various items, and the RFID reader can read the RFID tags of the items. The processor 125 can identify the items based on their RFID tags. In various embodiments, the RFID reader may not be located at the robotic arm 406. Rather, the compartment or sub-compartment 402 can include multiple RFID readers in predetermined locations within the compartment 402, and items can be placed by the robotic arm 406 at the predetermined locations. In such an embodiment, the RFID tag of each item would be read by the RFID reader corresponding to the predetermined location where the item is located. Other variations are contemplated to be within the scope of the present disclosure.

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

Figure 15:
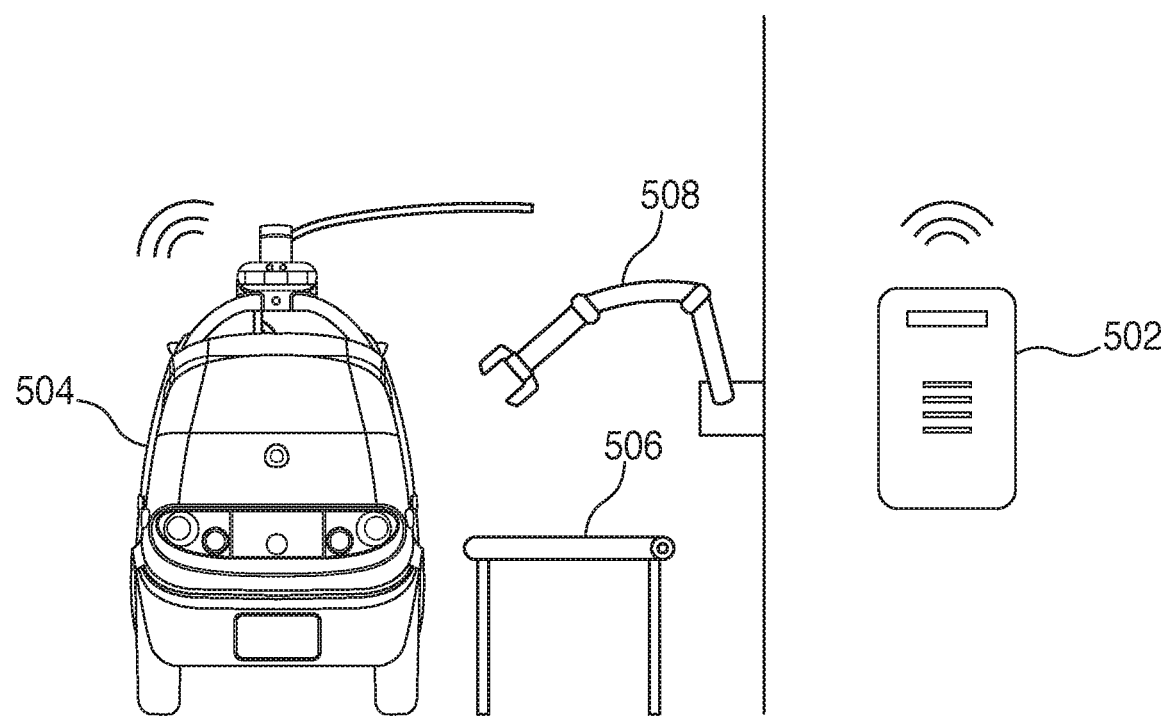
FIG. 15 is a diagram of an exemplary warehouse or other facility for autonomously loading or unloading items, in accordance with aspects of the present disclosure.

With reference now to FIG. 15, there is shown a diagram of a warehouse or facility for autonomously loading or unloading items. In various embodiments, the facility can be a retailer or a business, such as a grocery store, a supermarket, a megastore, a clothing store, a drive-thru facility, a drive-in store, or another retailer or business. As described above herein, a communication module (160, FIG. 12) of an autonomous robot vehicle can communicate with a transfer confirmation system 502 regarding a transfer operation, such as a loading operation or an unloading operation. The transfer confirmation system 502 can be a warehouse system or a facility system that manages the handling and storage of items in the warehouse or facility. The autonomous vehicle 504 can authenticate itself to the transfer confirmation system 502. In various embodiments, the autonomous vehicle 504 can perform the authentication by providing a customer order to the transfer confirmation system 502, and the transfer confirmation system 502 can verify the customer order. Once the autonomous vehicle 504 has been authenticated, the autonomous vehicle 504 can open an access door to provide access to a compartment or sub-compartment. In various embodiments, the warehouse or facility includes a conveyor belt 506 and a robotic arm 508 that are separate from the robotic movement apparatus of the autonomous vehicle 504. In various embodiments, the warehouse or facility may not include a robotic arm 508. In various embodiments, the autonomous vehicle 504 may not include any robotic movement apparatus, and the robotic arm 508 of the warehouse or facility can move items into and out of the autonomous vehicle 504. In various embodiments, the robotic arm 508 of the warehouse or facility can include an imaging device (not shown) secured to the robotic arm 508. The imaging device can be any of the imaging devices described above herein and perform the operations described above herein, including capturing imaging information of one or more compartments or sub-compartments of the autonomous vehicle to identify items or to identify available space. In various embodiments, the imaging device need not be secured to the robotic arm 508 and can be secured to a wall or ceiling or another structure of the facility or in the facility, such as another robotic movement apparatus of the warehouse or other facility. The transfer confirmation system 502 and the communication module of the autonomous vehicle 504 can communicate information to coordinate the movement of items from the warehouse or facility to the autonomous vehicle 504 or from the autonomous vehicle 504 to the warehouse.

Figure 16:
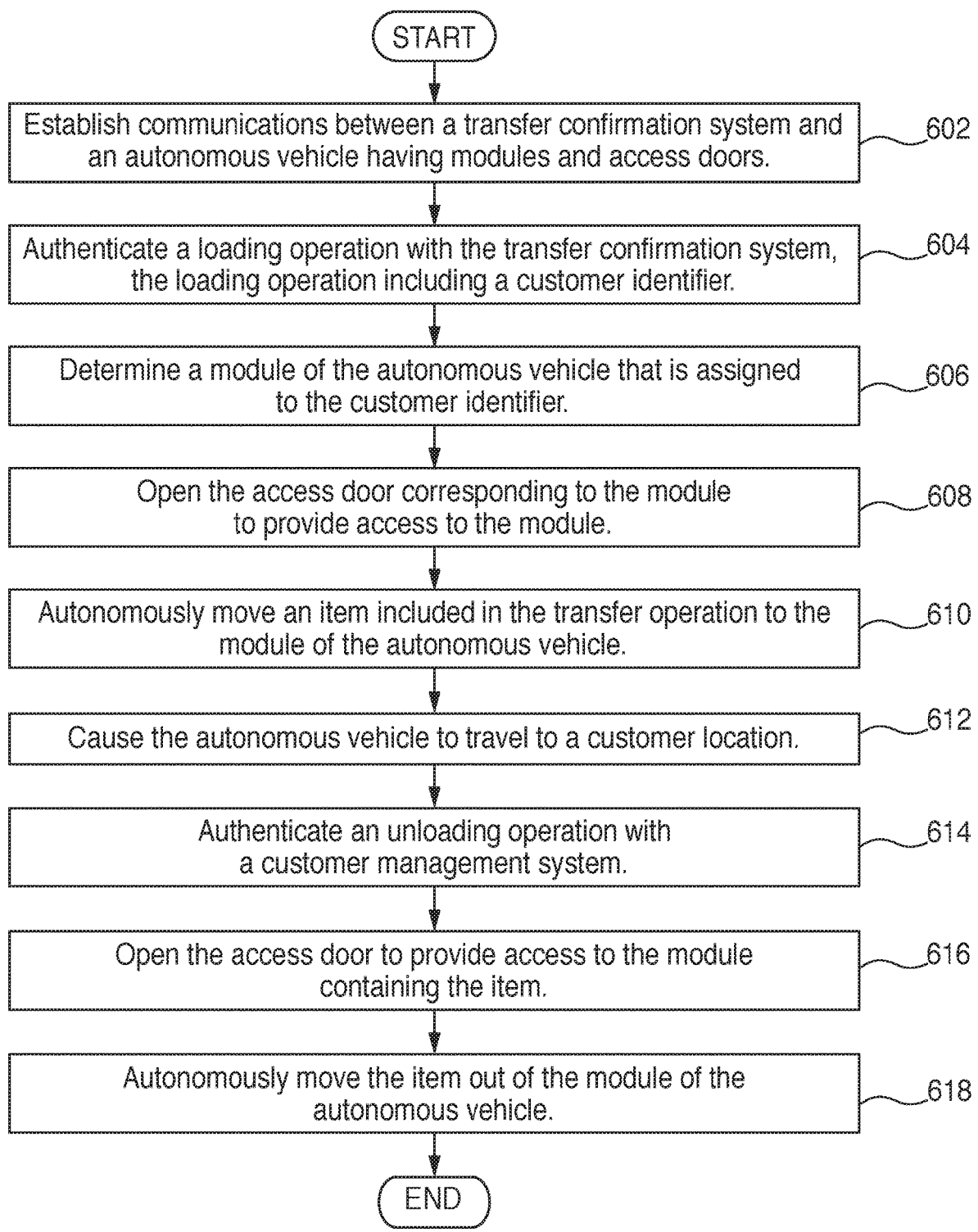
FIG. 16 is a flow diagram of an exemplary operation of autonomously loading or unloading items, in accordance with aspects of the present disclosure.

Referring to FIG. 16, there is shown a flow diagram of autonomous loading and unloading operations. At step 602, the operation involves establishing communications between a transfer confirmation system and an autonomous vehicle having modules and access doors. In various embodiments, the transfer confirmation system can be a warehouse system of a warehouse or facility where items are to be loaded into the autonomous vehicle. At step 604, the operation involves authenticating a loading operation with the transfer confirmation system where the loading operation includes a customer identifier. The customer authentication can include, for example, authenticating that the autonomous vehicle is the correct vehicle to receive the customer items of the loading operation. Once authenticated, the operation at step 606 involves determining a module of the autonomous vehicle that is assigned to the customer identifier. In various embodiments, a compartment or sub-compartment can be assigned to a single customer. In various embodiments, a compartment or sub-compartment can be assigned to multiple customers. At step 608, the autonomous vehicle opens the access door corresponding to the module assigned to the customer, to provide access to the module. At step 610, the operation involves autonomously moving an item included in the transfer operation to the module of the autonomous vehicle. In various embodiments, the moving operation can involve identifying an available space within the module for the item and moving the item into the available space, as described above herein. In various embodiments, the moving operation can be performed by a conveyor belt and/or a robotic arm of the autonomous vehicle, and/or by a conveyor belt and/or a robotic arm of the warehouse or facility. The autonomous vehicle and the warehouse system can coordinate to effectuate the loading of items into the compartment or sub-compartment. After all items are loaded, the operation involves causing the autonomous vehicle to travel to the customer location at step 612.

At step 614, the operation involves authenticating an unloading operation with a customer management system. The customer management system can be, for example, the central server 110 of FIG. 11 or the fleet management module 160 of FIG. 12. In various embodiments, an unloading operation can unload an item to a customer mailbox, customer sidewalk, driveway, curb, residence, customer drop site, or another customer location. In various embodiments, the customer management system can authenticate the unloading operation by having a customer enter a PIN either at the autonomous vehicle or remotely through a customer device, such a smartphone, or by other ways described above herein. In various embodiments, a customer can pre-authorize an unloading operation for a particular customer location, and authenticating the unloading operation involves confirming with the customer management system that the pre-authorization is still active. Other variations are contemplated. At step 616, the autonomous vehicle opens the access door to provide access to the module containing the item, and at step 618, the autonomous vehicle autonomously moves the item out of the module of the autonomous vehicle. As described above herein, a conveyor belt and/or a robotic arm, or another robotic movement apparatus can be used to autonomously move the item or items out of the module of the autonomous. After the customer item or items have been removed from the autonomous vehicle, the operation ends.

The operation of FIG. 15 is exemplary and does not limit the scope of the present disclosure. By the exemplary operation described in FIG. 15, autonomous loading and unloading of autonomous vehicles can decrease the costs of operating autonomous delivery vehicles and improve their efficiency and effectiveness.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. It is contemplated that various embodiments disclosed herein can be combined in various ways that are not expressly described or shown herein, and such combinations of disclosed embodiments are contemplated to be within the scope of the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An autonomous system for loading or unloading an autonomous vehicle, the autonomous system comprising:
    at least one module including at least one of: a compartment or a sub-compartment, the at least one module located in the autonomous vehicle;
    a robotic movement apparatus configured to autonomously move items to or from the at least one module;
    one or more processors;
    at least one memory storing instructions which, when executed by the one or more processors, cause the autonomous system to autonomously move an item, using the robotic movement apparatus, to or from the at least one module of the autonomous vehicle; and
    an imaging device configured to capture imaging information of the at least one module.

2. The autonomous system of claim 1, wherein the at least one module includes a plurality of modules, wherein the instructions, when executed by the one or more processors, further cause the autonomous system to:
    associate each of the plurality of modules with respective customers;
    identify a customer of the item;
    determine that the at least one module is associated with the customer of the item; and
    autonomously move the item to or from the at least one module.

3. The autonomous system of claim 2, wherein the robotic movement apparatus includes a conveyor belt.

4. The autonomous system of claim 1, wherein the instructions, when executed by the one or more processors, further cause the autonomous system to:

identify, based on the imaging information, an available space within the at least one module that can receive the item; and autonomously move the item to the available space.

5. The autonomous system of claim 1, wherein the item is contained in the at least one module, and wherein the instructions, when executed by the one or more processors, further cause the autonomous system to:

based on the imaging information, locate the item within the at least one module; and autonomously move the item out of the at least one module.

6. The autonomous system of claim 1, wherein the item is contained in the at least one module and includes a barcode, the imaging information includes an image of the barcode, and the instructions, when executed by the one or more processors, further cause the autonomous system to locate the item in the at least one module based on the image of the barcode.

7. The autonomous system of claim 1, wherein the imaging device is located in the autonomous vehicle.

8. The autonomous system of claim 7, wherein the robotic movement apparatus is located within the autonomous vehicle, and wherein the imaging device is secured to the robotic movement apparatus.

9. The autonomous system of claim 1, wherein the imaging device is located outside the autonomous vehicle and in a facility where the autonomous vehicle is to be loaded or unloaded.

10. The autonomous system of claim 1, wherein the robotic movement apparatus is separate from the autonomous vehicle.

11. The autonomous system of claim 1, wherein the item includes an RFID tag and the robotic movement apparatus includes a robotic arm, the autonomous system further comprising an RFID reader secured to the robotic arm and configured to read the RFID tag.

12. The autonomous system of claim 1, further comprising:

a communication sub-system of the autonomous vehicle; and at least one access door of the autonomous vehicle, the at least one access door corresponding to the at least one module and configured to open to provide access to the at least one module.

13. The autonomous system of claim 12, wherein the instructions, when executed by the one or more processors, further cause the autonomous system to:

authenticate a transfer operation with a transfer confirmation system, the transfer operation including a customer identifier;

determine one module of the at least one module assigned to the customer identifier; and open one of the at least one access door corresponding to the one module to provide access to the one module.

14. The autonomous system of claim 13, wherein the transfer operation is a loading operation, and wherein the transfer confirmation system is a system of a facility.

15. The autonomous system of claim 13, wherein the transfer operation is an unloading operation, and wherein the transfer confirmation system is a customer management system.

16. The autonomous system of claim 15, wherein the unloading operation includes autonomously unloading, by the robotic movement apparatus, the item out of the one module at a customer location.

17. An autonomous method for autonomously loading or unloading an autonomous vehicle, the method comprising:

establishing communications between a transfer confirmation system and the autonomous vehicle, wherein the autonomous vehicle includes:

at least one module that includes at least one of: a compartment or a sub-compartment, at least one access door corresponding to the at least one module and configured to open to provide access to the at least one module; and an imaging device configured to obtain imaging information of the at least one module;

authenticating a loading operation with the transfer confirmation system, the loading operation including a customer identifier;

determining one module of the at least one module assigned to the customer identifier;

opening one access door of the at least one access door corresponding to the one module to provide access to the one module; and autonomously moving an item included in the loading operation to the one module of the autonomous vehicle.

18. The autonomous method of claim 17, further comprising:

identifying, based on the imaging information, an available space within the at least one module that can receive the item, wherein autonomously moving the item includes moving the item to the available space.

19. The autonomous method of claim 17, further comprising:

authenticating an unloading operation with a customer management system;

opening the one access door to provide access to the one module; and autonomously moving the item out of the one module of the autonomous vehicle.

20. The autonomous method of claim 19, the method further comprising:

locating the item within the one module based on the imaging information.

21. An autonomous system for loading or unloading an autonomous vehicle, the autonomous system comprising:

one or more memories configured to store processor-executable instructions;

one or more processors configured to execute the processor-executable instructions, wherein the processor-executable instructions, when executed by the one or more processors, cause the one or more processors to:

establish communications between a transfer confirmation system and the autonomous vehicle, wherein the autonomous vehicle includes at least one module that includes at least one of: a compartment or a sub-compartment, and at least one access door corresponding to the at least one module and configured to open to provide access to the at least one module;

authenticate a loading operation with the transfer confirmation system, the loading operation including a customer identifier;

determine one module of the at least one module assigned to the customer identifier;

open one access door of the at least one access door corresponding to the one module to provide access to the one module; and autonomously move an item included in the loading operation to the one module of the autonomous vehicle; and an imaging device configured to obtain imaging information of the at least one module.

22. The autonomous system of claim 21, wherein the processor-executable instructions, when executed by the one or more processors, further cause the one or more processors to:
   identify, based on the imaging information, an available space within the at least one module that can receive the item, wherein the processor-executable instructions, when executed by the one or more processors, cause the one or more processors to move the item to the available space.

* * * * *